US006810581B2

(12) United States Patent
Takada

(10) Patent No.: US 6,810,581 B2
(45) Date of Patent: Nov. 2, 2004

(54) CRIMPING APPARATUS FOR SUB-HARNESS PRODUCTION EMPLOYING MOVABLE CONNECTOR TABLES SECURABLE TO FRAME MEMBERS

(75) Inventor: Kazuhiko Takada, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 49 days.

(21) Appl. No.: 09/986,574

(22) Filed: Nov. 9, 2001

(65) Prior Publication Data

US 2002/0029472 A1 Mar. 14, 2002

Related U.S. Application Data

(62) Division of application No. 08/974,554, filed on Nov. 19, 1997, now Pat. No. 6,360,436.

(30) Foreign Application Priority Data

Nov. 22, 1996 (JP) ............................................ 8-311860

(51) Int. Cl.[7] .......................... B23P 19/00; H01R 43/00

(52) U.S. Cl. ............................ 29/749; 29/745; 29/747; 29/748; 29/857; 29/861; 29/863; 198/346.1

(58) Field of Search .......................... 29/745, 747, 748, 29/857, 861, 865, 866, 755, 749, 753, 863; 148/346.1, 346.2

(56) References Cited

U.S. PATENT DOCUMENTS

| | | | | | |
|---|---|---|---|---|---|
| 3,735,467 | A | * | 5/1973 | Smart | 29/757 |
| 3,754,324 | A | * | 8/1973 | Krehbiel et al. | 29/853 |
| 4,043,032 | A | | 8/1977 | Spangler | 29/628 |
| 4,281,442 | A | | 8/1981 | Senior et al. | 29/33 M |
| 4,367,575 | A | * | 1/1983 | Forster et al. | 29/33 M |
| 4,489,476 | A | * | 12/1984 | Over et al. | 29/564.4 |
| 4,492,023 | A | * | 1/1985 | Schneider et al. | 29/861 |
| 4,566,164 | A | | 1/1986 | Brown et al. | 29/33 M |
| 4,729,152 | A | | 3/1988 | Hammond et al. | 29/33 M |
| 4,976,294 | A | * | 12/1990 | Kudo et al. | 140/102 |
| 5,119,666 | A | * | 6/1992 | Fujiwara | 72/442 |
| 5,208,969 | A | | 5/1993 | Hidese | 29/740 |
| 5,249,662 | A | * | 10/1993 | Nakano et al. | 198/346.1 |
| 5,432,995 | A | * | 7/1995 | Takenami et al. | 29/753 |
| 5,454,523 | A | | 10/1995 | Matsuda | |
| 5,611,141 | A | | 3/1997 | Takada et al. | |
| 5,737,835 | A | * | 4/1998 | Murata | 29/863 |
| 5,791,037 | A | * | 8/1998 | Takada et al. | 29/566.3 |
| 5,878,489 | A | | 3/1999 | Shioda et al. | 29/857 |
| 5,933,932 | A | * | 8/1999 | Watanabe et al. | 29/33 M |

FOREIGN PATENT DOCUMENTS

| | | |
|---|---|---|
| JP | 7-161437 | 6/1995 |
| JP | 7-161440 | 6/1995 |
| JP | 8-124967 | 5/1996 |
| JP | 8-189511 | 7/1996 |

OTHER PUBLICATIONS

U.S. patent application Ser. No. 08–857,249 filed May 16,1997 for Method and Apparatus of Manufacturing Wiring Harness.

U.S. patent application Ser. No. 08/870,289 filed Jun. 6, 1997 for Pressure Welding Apparatus and Pressure Welding Method.

* cited by examiner

*Primary Examiner*—Rick Kiltae Chang
(74) *Attorney, Agent, or Firm*—Armstrong, Kratz, Quintos, Hanson & Brooks, LLP

(57) ABSTRACT

A crimping apparatus comprises a pair of frames; a pair of crimpers each provided centrally in each frame; pairs of connector tables each provided movably in a longitudinal direction on each frame; locking means for securing the connector tables on both ends of each frame; moving means for moving each said connector table along the frame; and a pair of connector holding poles in each of which a plurality of connectors are arranged to be settable on each the connector table. Thus, a large number of kinds of sub-harnesses can be manufactured.

4 Claims, 13 Drawing Sheets

CRIMPING APPARATUS FOR SUB-HARNESS PRODUCTION EMPLOYING MOVABLE CONNECTOR TABLES SECURABLE TO FRAME MEMBERS

This Application is a Div of Ser. No. 08/974,554 Nov. 19, 1997 now U.S. Pat. No. 6,360,436.

BACKGROUND OF THE INVENTION

1. Field of the Invention

The present invention relates to a crimping apparatus having a pair of crimpers provided correspondingly in a pair of frames and a pair of connector tables located on each frame and capable of manufacturing various kinds of sub-harnesses and a method of manufacturing them.

2. Description of the Prior Art

FIGS. 14 to 16 show a crimping apparatus disclosed in JP-A-7-161438 and JP-A-161439(which correspond to U.S. Pat. No. 5,454,523).

A crimping apparatus, generally 81, as shown in FIG. 14, sends an electric wire 82 (simply referred to as "wire") to a pair of crimpers 86 and 86' arranged in a wire shifting direction through a supporting roller 83, guide roller 84 and measuring roller 85, and crimps the wire onto connectors 89 and 89' on moving tables 87 and 87' below the respective crimpers 86 and 86' by the ascent/descent operation of vertical cylinders 88 and 88'. After the wire is crimped on the connector on the forward moving table 87', it is extended to a prescribed length like 82*a* by the measuring roller 85 and crimped on the connector on the backward moving table 87. The connector is equipped with a crimping terminal.

As seen from FIG. 15, the connectors 89 and 89' are loaded on the moving tables 87 and 87', respectively. Specifically, a cover 91 is opened by pulling a handle 90 and the connector 89 is loaded in a load section 92. The connector 89 is hooked by a hook (not shown) at a tip of a horizontal cylinder 93 and moved to a stopper 94 on the moving table 87. As shown in FIGS. 16A and 16B, a crimping blade 96 falls from a slit 95 on the connector 89 to crimp the wire 89 on the connector 89. The wire 82 can be crimped in a crossing manner by movement of a moving table 87.

As shown in FIG. 16A, the wire 82 is crimped in a state where it is held by a wire holder 99 of the cylinder 97 which falls integrally with crimping blade 96. The crimping blade 96 is driven by the vertical cylinder 86 (FIG. 14). As the crimping blade 96 falls, the wire 82 is cut by a cutter 98 and crimped on the crimping terminal 100 within the connector as shown in FIG. 16B.

In the above configuration, however, as shown in FIG. 15, only the connectors corresponding to a set of sub-harnesses can be supplied. In addition, the connectors must be manually loaded one by one. This requires further improvement of productivity and workability. Further, only the connectors having a single shape (common in only the longitudinal cross section and different in length) could be loaded so that sub-harnesses using various kinds of connectors could not be manufactured. Therefore, the arrangement of connectors are likely to be limited, thus making "set production of sub-harnesses" in which the completed sub-harness has a product pattern) difficult. Further, in FIG. 16, where the height h of the connector 89 is large, positioning of the wire 82 by the wire holder 99 was apt to be unstable.

SUMMARY OF THE INVENTION

A first object of the present invention is to provide a crimping apparatus capable of improving the productivity of sub-harnesses and supplying efficiency of connectors, permitting set-production of sub-harnesses, and surely positioning a wire even when the height of the connector is large.

A second object of the present invention is to provide a method of manufacturing a wiring harness using such an apparatus.

In order to attain the first object, there is provided a crimping apparatus comprising a pair of frames arranged orthogonal to a wire shifting direction; a pair of crimpers each provided centrally in each frame; a pair of connector tables each provided movably in a longitudinal direction of each frame; locking means for securing the connector tables on both ends of each frame; a pair of moving means for moving each said connector table along the frame; and connector holding poles in each of which a plurality of connectors are arranged to be settable on each said connector table.

In order to attain the second object, there is provided a method of manufacturing a sub-harness using a crimping apparatus including a crimper provided centrally in a frame and a pair of first and second connector tables slidable in the longitudinal direction of the frame, comprising the steps of:

moving the first connector table immediately beneath said crimper; supplying a connector to said second connector table while crimping a wire onto a connector on said first connector table to form a sub-harness; returning said first connector table to an initial position; moving said second connector table immediately beneath said crimper; and removing the sub-harness from the first connector table to supply another connector to said first connector table while crimping the wire onto the connector on the second connector table.

In accordance with the present invention, while a wire can be crimped onto a connector on the first connector table, another connector can be supplied to the second connector table, or otherwise a sub-harness can be recovered from the second connector table. Thus, the time taken from connector supply to take-out of a product can be shortened, thereby improving the productivity of the sub-harness.

The above and other objects and features of the present invention will be more apparent from the following description taken in conjunction with the accompanying drawings.

DESCRIPTION OF THE PREFERRED EMBODIMENTS

Figure 1:
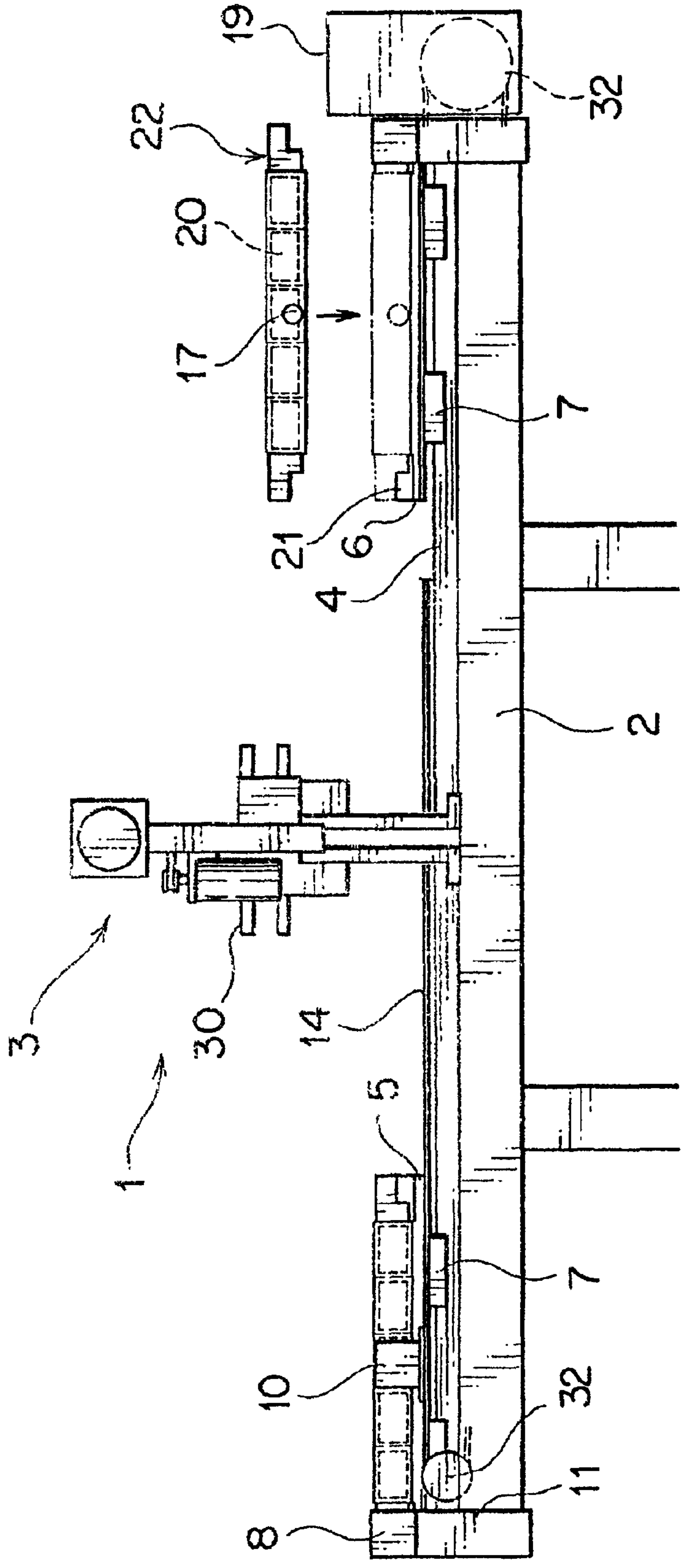
FIG. 1 is a front view of a crimping apparatus according to an embodiment of the present invention.
Figure 2:
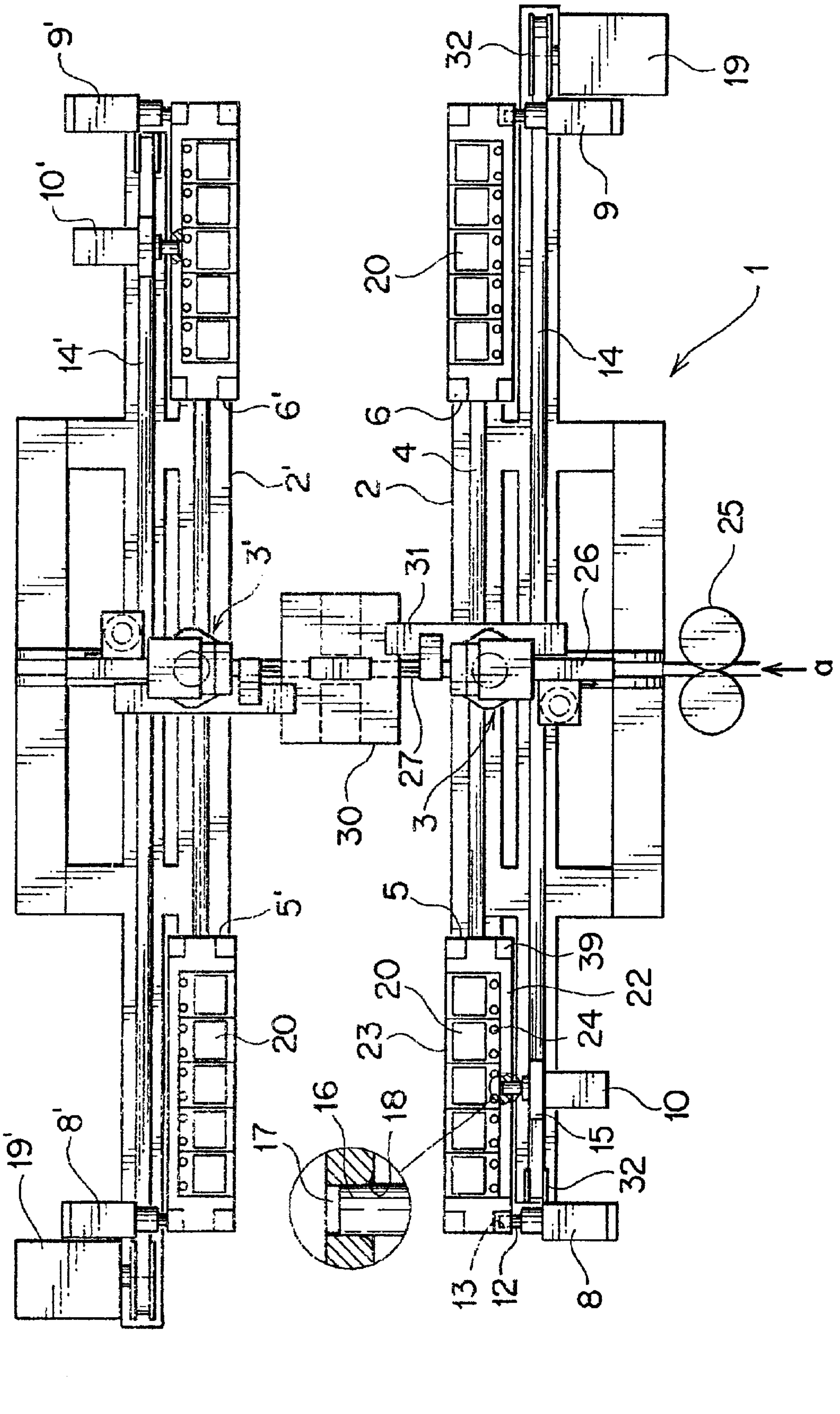
FIG. 2 is a plan view of the crimping apparatus.
Figure 3:
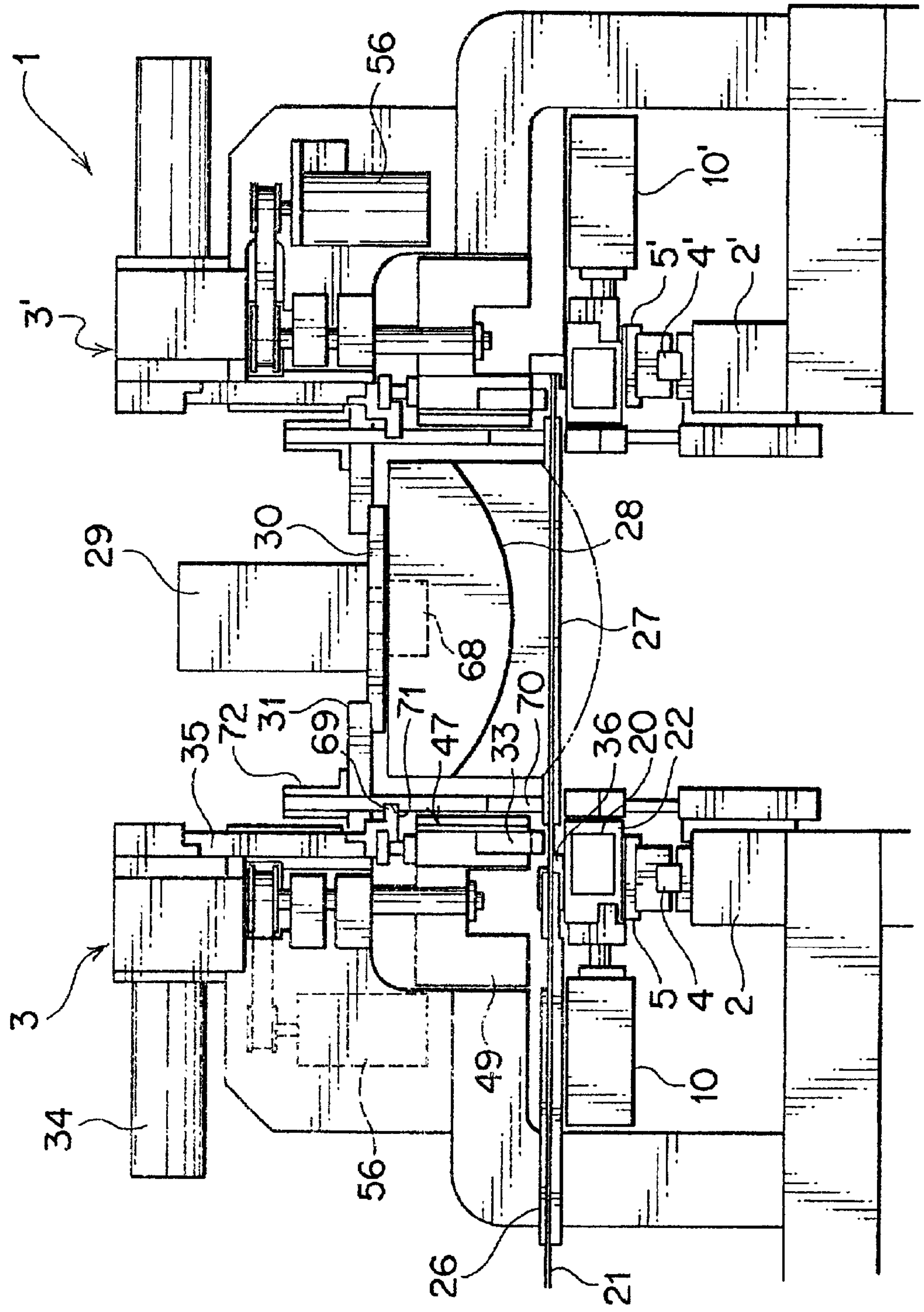
FIG. 3 is a side view of the crimping apparatus.

Now referring to the drawings, an explanation will be given of embodiments of the present invention. FIG. 1 is a front view of a crimping apparatus according to an embodiment of the present invention. FIG. 2 is a plan view of the crimping apparatus. FIG. 3 is a side view of the crimping apparatus.

As shown in FIG. 1, a crimping apparatus 1 is provided with a crimper 3 arranged centrally on a horizontal frame. A guide rail 4 is arranged along the frame 2. A pair of left and right connector tables 5 and 6 are slidably engaged with the guide rail 4 by "LM guides" 7. They can be secured on both sides of the frame 2 by locking means 8 and 9 (not shown). They can be also moved immediately beneath the crimper 3 by moving means 10.

As shown in FIG. 2, a pair of frames 2 and 2' are arranged back-and-forth symmetrically in a direction orthogonal to a wire shifting direction (arrow a). Each of the frames 2 and 2' is provided with a pair of connector tables 5, 5' and 6, 6' (four connector tables in total), symmetrically arranged, respectively. Each of the connector tables 5, 5' and 6, 6' has the same shape and size. On each of the connector tables 5, 5' and 6, 6', a plurality of connectors 20 are arranged in parallel. On both ends of each of the frames 2 and 2', fixed air cylinders 8, 8' and 9, 9' are secured by stays 11 which serves as the above locking means (FIG. 1). The tip of the rod 12 of each of the fixed cylinders 8, 8' and 9, 9' is engageable with an engagement hole 13 near to the outer end of each connector table.

Timing belts 14 and 14' serving as a driving means are arranged in a longitudinal direction of the frames 2 and 2', respectively. To the timing belt 14(14'), a movable air cylinder 10 (10') is attached using a bracket 15. The tip of the rod 16 of the movable cylinder 10 (10') advances into a central engagement hole 17 of a connector holding pole 22 (described later) of each of the connector tables 5 (5') and 6 (6') so that the connector tables 5 (5') and 6 (6') can move along the guide rail 4 (4'). The connector holding rod 22 holds a plurality of connectors 20 arranged in parallel.

Since the engagement hole 17 is formed in the connector holding pole 22 but not in the connector tables 5(5') and 6(6'), the positioning accuracy of the connectors for the crimper 3 (3') is improved. The engagement hole 17 has a curved guiding surface for the rod 16. The connector tables 5 (5') and 6 (6') are positioned at reference positions by the fixed cylinders 8 (8') and 9 (9'), and the rod 16 of the movable cylinder 10 (10') is caught correctly.

A servo motor 19 (19') which is arranged at one end of each frame 2 (2') can move the timing belt 14 (14') by a desired distance accurately through a timing pulley 32. The servo motor 19 (19') is driven on the basis of the position data previously stored in the control unit (not shown).

Thus, the connector tables 5 (5') and 6 (6') are moved from the ends of the frame 2 (2') to the center position thereof so that they are accurately positioned immediately beneath the crimper 3 (3').

The connector tables 5 (5') and 6 (6') are moved by the servo motor 19 (19') by a small distance to crimp the wire 21 (FIG. 3) onto a crimping terminal (not shown) within the connector 20. The connector tables 5 (5') and 6 (6') can also be driven by a ball screw in place of the timing belt 14 (14').

The connector table 5 (5') and 6 (6') have, at their both ends, frameworks 39 each having a square-rod shape from which the connector holding rod 22 which is rectangular is removable. The connector holding pole 22 has been proposed in Japanese Patent Appln. 8-124967. On the connector holding pole 22, a plurality of holding members 23 corresponding to the connectors having various sizes and shapes are removably secured in parallel by bolts 24. The holding members 23 are displaced so that the connectors having desired shapes can be arranged at random. The holding members 23 have the same outer size, but have different shapes of the connector supporting portions corresponding to the various kinds of connectors 20. The connector holding poles 22 has equal sizes and hence can be fit in any connector table 5 (5') and 6 (6').

The wire 21 (FIG. 3) sent out by the measuring roller 25 (FIG. 2) traverses the backward frame 2 along the wire guide 26 and reaches the forward frame 2' by the wire guide 27 which can be opened/closed by a horizontal cylinder 68. In FIG. 3, with the connector table (e.g. 5, 5') located beneath each crimper 3 (3'), the tip of the wire 21 is located on the connector 20 of the forward connector table 2' and the intermediate portion of the wire 21 is located on the connector of the backward connector table 2.

In FIG. 3, reference numeral 28 denotes a push-down jig used when the wire by the measuring roller 25 is reeled by a prescribed length. Reference numeral 29 denotes a cylinder for driving the push-down jig 28. They are arranged on a center table 30 which is coupled with both frames 2 and 2' through arms 31. The wire guide 27 and the push-down jig 28 have been proposed in JP-A-7-161437 (which also corresponds to U.S. Pat. No. 5,454,523).

With a crimping blade 33 located above the wire 21, a slider 35 falls by driving the servo motor 34 to push the crimping blade 33. Thus, the crimping blade 33 falls integrally with the slider 35 to push down the wire 21. Then, simultaneously when the wire 21 is cut by a cutter 36, it is crimped onto the connector 20. The crimpers 3 and 3' are located symmetrically in a shifting direction of the wire and have substantially the same structure. The crimpers will be described in detail later.

FIG. 4 shows a harness manufacturing method using the crimping apparatus described above.

Figure 4A:
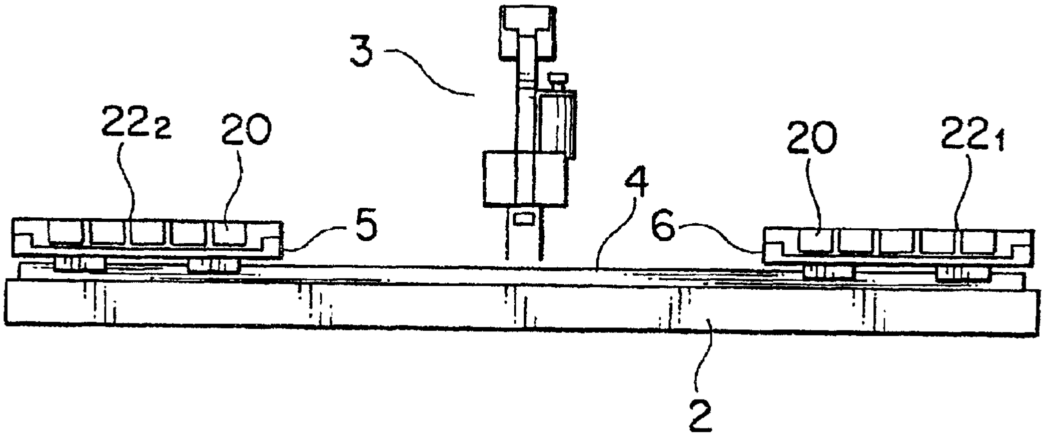
FIGS. 4A to 4C are front views showing an exemplary method of manufacturing a wiring harness according to the present invention.

Fist, with the connector tables 5 and 6 located on both sides of the frame 2 as shown in FIG. 4A, a connector holding pole $\mathbf{22}_1$ is set in the one connector table 6. Desired connectors are previously arranged in the connector holding pole 22. Specifically, the connectors having various shapes are previously mounted automatically or manually on a large number of various kinds of connector holding poles in accordance with the formats of various sub-harnesses in a separate step. It is of course that the connectors having the same format may be arranged on the large number of connector holding poles having the same format.

Figure 4B:
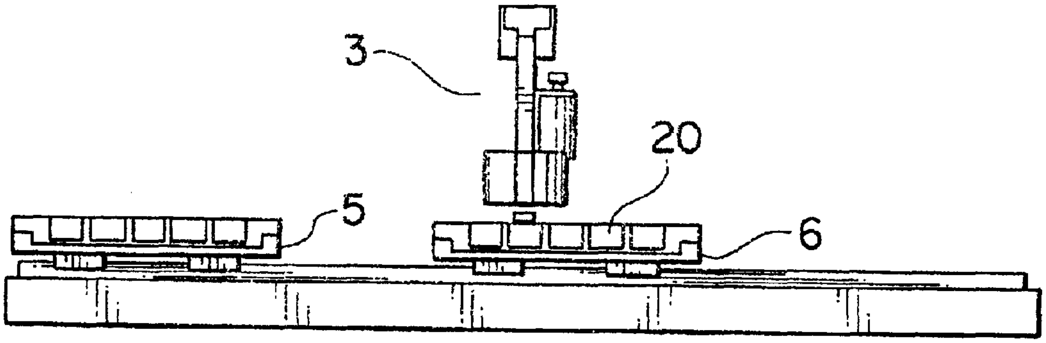

The fixed cylinder 9 (FIG. 2) is unlocked so that as shown in FIG. 4B, the one connector table 6 is slid to immediately beneath the central crimper 3 by driving the servo motor 19 and timing belt 14 (FIG. 2). The, the wire 21 (FIG. 3) is crimped onto the connectors 20 on the connector table 6. In the meantime, a connector holding pole $\mathbf{22}_2$ is set in the other connector table 5. Various connectors 20 are previously mounted in the connector holding pole $\mathbf{22}_2$ as described above.

Figure 4C:
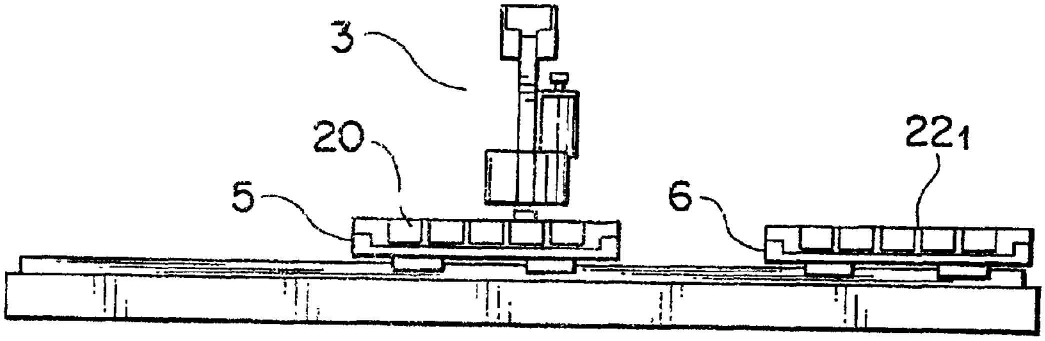

After the wire 21 has been crimped on the connectors 20 on the one connector table 6, as shown in FIG. 4C, the one connector table 6 is returned to its initial position. The other connector table 5 is slid to immediately beneath the central crimper 3 and the wire 21 is crimped onto the connectors 20 of the other connector table 5. In the mean time, the connector holding pole $\mathbf{22}_1$ is removed from the one connector table 6 and a new connector holding pole is set in the one connector table 6.

After the wire 21 has been crimped on the connectors 20 on the other connector table 5, as shown in FIG. 4B, the one connector table 5 is returned to its initial position. The one connector table 6 is slid to immediately beneath the central crimper 3. Such a cycle is repeated to crimp the wire onto groups of connectors on the right and left sides alternately so that the time taken from the step of connector setting to that of connector taking out can be greatly shortened.

Further, as shown in FIG. 2, since pairs of connector tables 5 and 6 and 5' and 6' arranged on the left and right sides are used, different sub-harness formats can be formed by left and right groups of connectors.

Figure 5A:
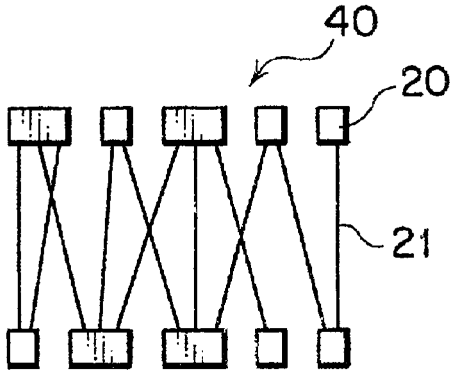
FIGS. 5A and 5B are plan views showing a sub-harness, respectively.
Figure 5B:
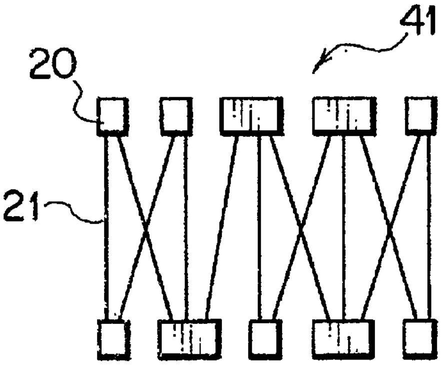

FIGS. 5A and 5B show examples of the sub-harness formats. The sub-harness 40 shown in FIG. 5A is formed by the connector tables 5 and 5' on the left sides of both frames 2 and 2'. The sub-harness 41 shown in FIG. 5B is formed by the connector tables 6 and 6' on the right sides of both frames 2 and 2'.

In FIG. 2, with the forward and backward connector tables 5 and 5', and 6 and 6' located immediately beneath the respective crimpers 3 and 3', the wire 20 is crimped onto the respective connectors 20. The sub-harnesses 40 and 41 shown in FIG. 5 are different from each other in the kind or arrangement of connectors and placing format of the wire 21. The cross-placement of the wire 21 can be made by moving the one connector table to shift the distance corresponding to the one connector.

Figure 6:
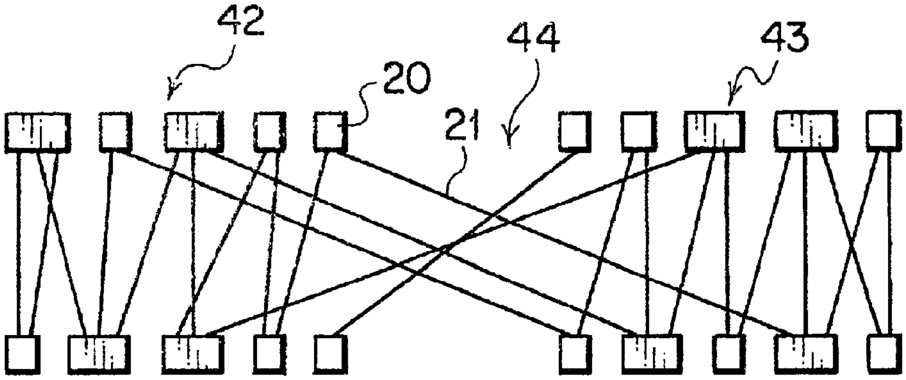
FIG. 6 is a plan view of a large sub-harness.

On the way of the process of the manufacturing sub-harness, immediately beneath the one crimper e.g. crimper 3, the one connector table 5 and the other connector table 6 can be replaced by each other so that as shown in FIG. 6, the wire 21 is crossed largely to provide a large sub-harness with the first sub-harness 42 and second sub-harness being connected to each other.

Figure 7A:
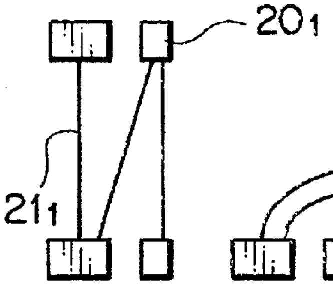
FIGS. 7A to 7C are plan views showing a method of U-turning a wire.
Figure 7B:
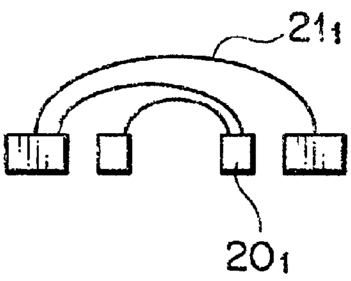

Further, a sub-harness 45 with the wire U-turned can be manufactured. specifically, as shown in FIG. 7A, the wire $\mathbf{21}_1$ is vertically or obliquely placed between the left sides of both frames 2 and 2'. The front connector $\mathbf{20}_1$ or connector table 5' is transferred into the right connector table 6 of the backward frame 2, thereby U-turning the wire $\mathbf{21}_1$ as shown in FIG. 7B. Further, with the connectors $\mathbf{20}_2$ set on the left and right connector tables 5' an 6' of the forward frame 2', the wire $\mathbf{21}_2$ is placed between them and the backward connectors $\mathbf{20}_1$.

Figure 7C:
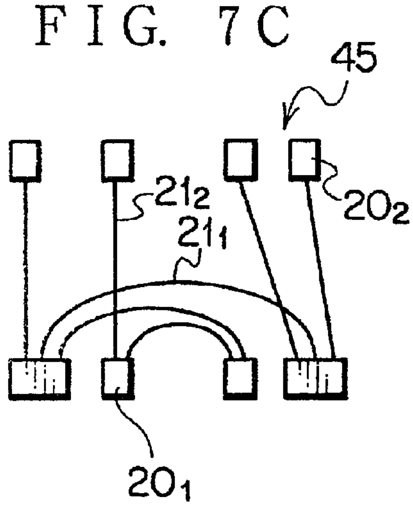

Since the connector holding pole 22 is made removable, in a cassette manner, from each of the connector tables 5, 5' and 6, 6' of both frames 2 and 2', the sub-harnesses 40, 41, 44 and 45 shown in FIGS. 5 to 7 can be manufactured quickly and surely without making replacement of the connector arrangement. As described above, different sub-harness formats can be set on the right and left sides of each of the crimpers 3 and 3' and in a cassette manner. Therefore, not the "lot production" of the sub-harness (in which the sub-harnesses having the same format are mass-produced and the sub-harnesses are assembled to make a product), but the "set production" (in which the product is made directly) can be realized. A production system can be also realized in which the volume of production is relatively low and there are a wide variety of products to be made.

In order to crimp the wire 21 onto the connectors 20 having different sizes and shapes at a high speed, in the crimpers 3 and 3' as shown in FIGS. 3 and 8–10, a plurality of applicators 47 (six in this example) each holding different crimping blades 33 slidably are arranged in a rotary manner.

Figure 8:
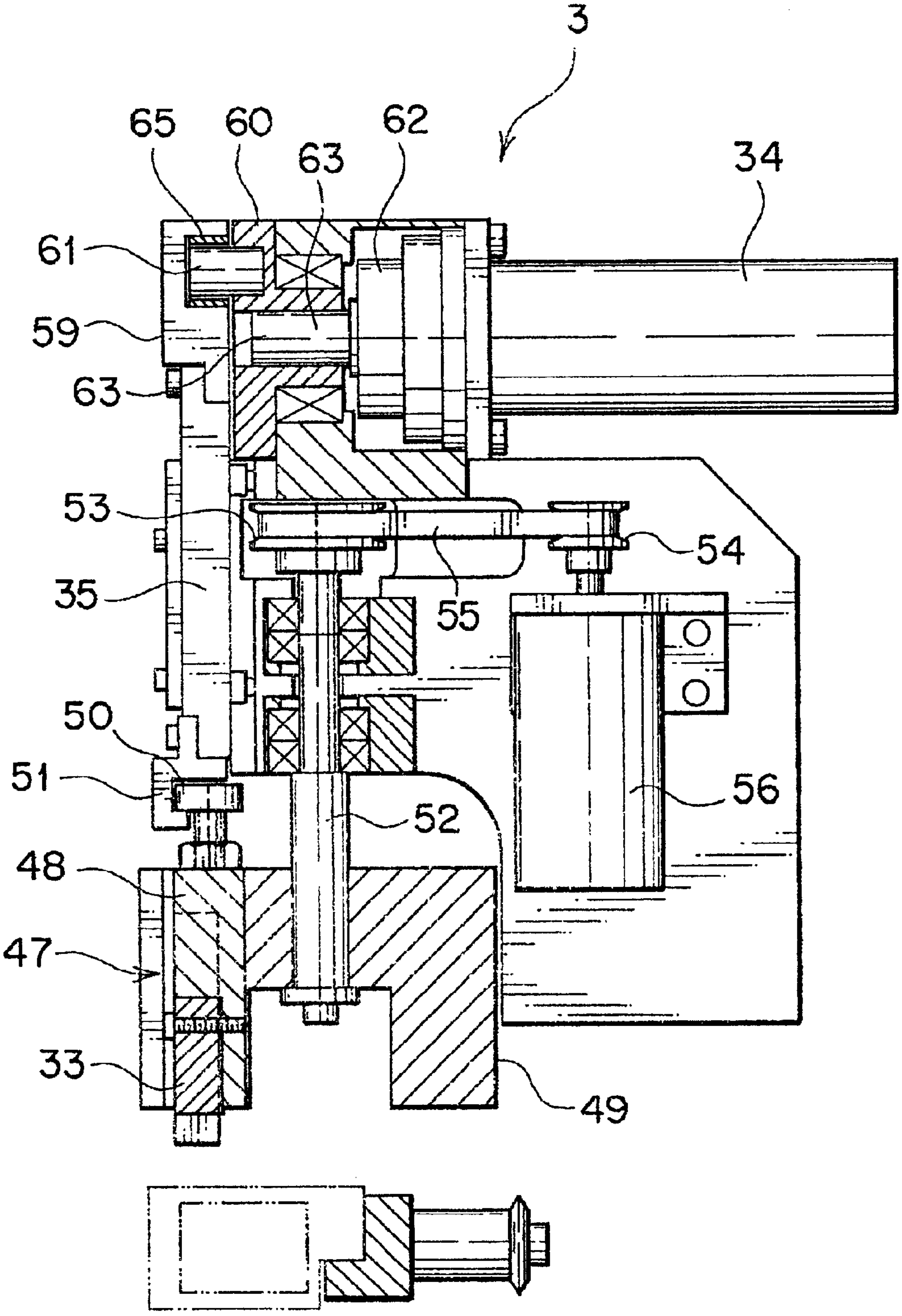
FIG. 8 is a side view of a crimper in the crimping apparatus.
Figure 10:
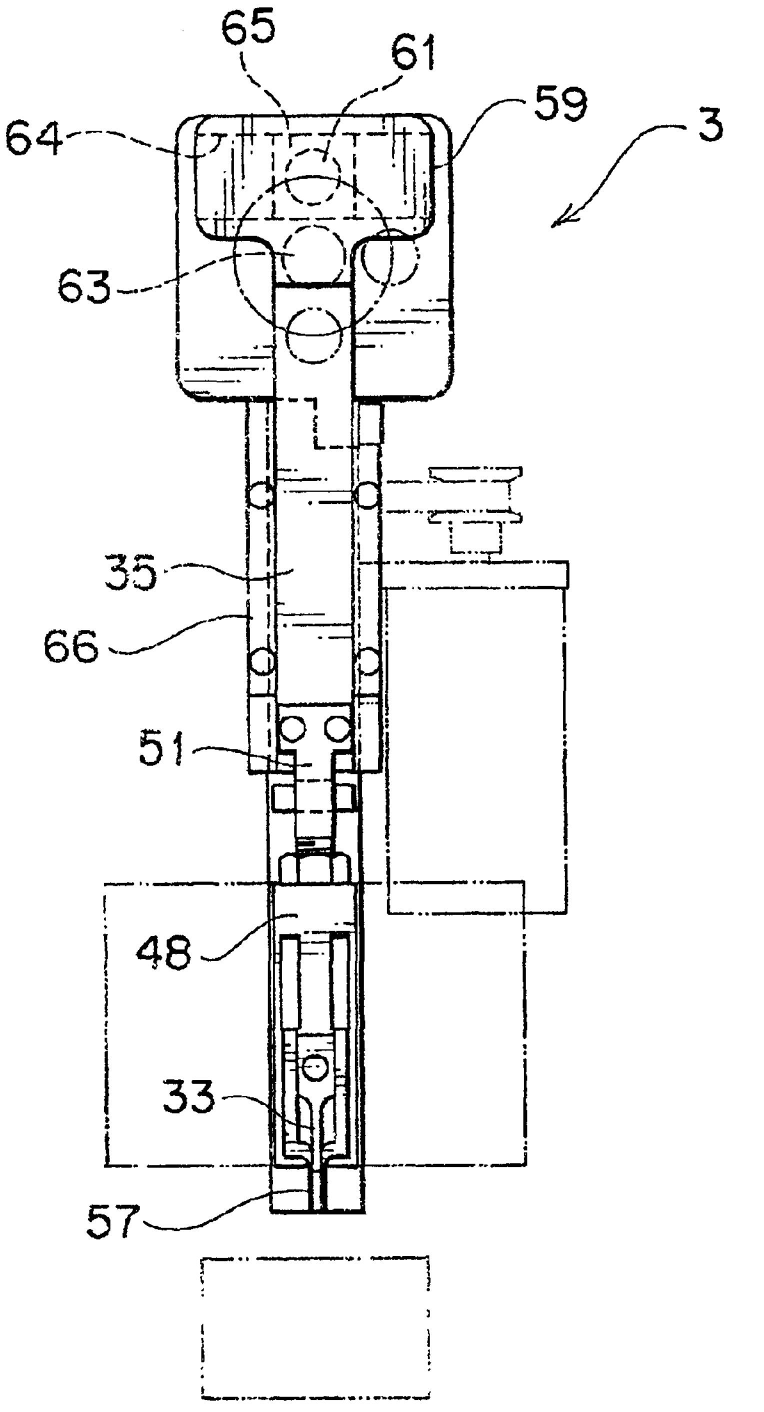
FIG. 10 is a front view of the crimper.

As shown in FIG. 8, the crimping blade 33 is secured to a shank 48 which is provided movably vertically in a rotor 49. The head 50 of the shank 48 is engaged with a lug 51 of a slider 35 and removed with the rotation of a rotor 49. The rotor 49 is secured to a rotor shaft 5 which is in turn connected to a servo motor 56 through pulleys 53, 54 and timing belt 55. In FIG. 10, reference numeral 10 denotes a blade guide which is movably spring-urged.

Figure 9:
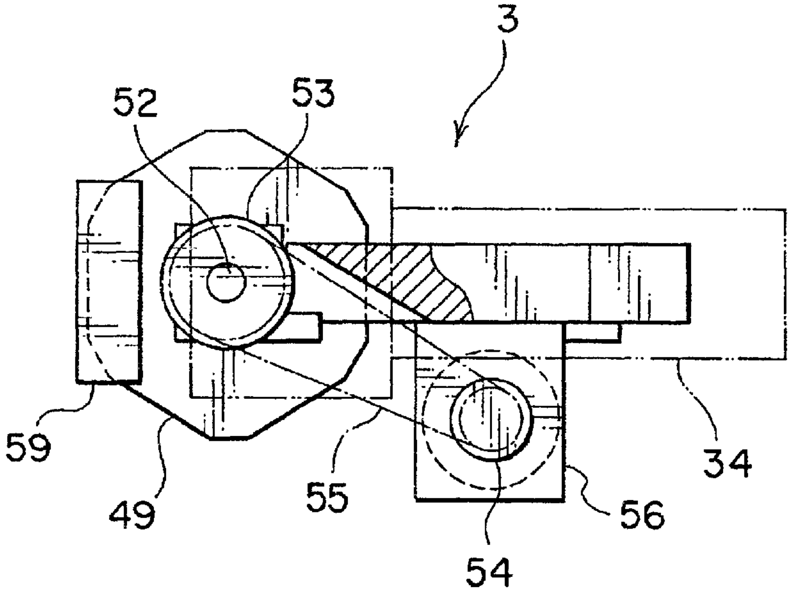
FIG. 9 is a plan view of the crimper.

The applicator itself of a rotary system has been already proposed in Japanese Patent Appln. 8-189511. Each applicator 47 includes the crimping blade 33 having a different size and shape and the shank 48, and arranged on each of six faces of the rotor 49 as shown in FIG. 9. The applicator 47 is removably bolted to the rotor 49. An applicator other than the six kinds of applicators can be also easily set.

Behind the measuring roller 25 shown in FIG. 2 (i.e. behind the backward crimper 3), a rotary wire supplier (not shown) for supplying the wire 21 having several kinds of diameters is arranged. The wire 21 is replaced by other wires in accordance with the kind and size of the crimping terminal of the connector 20. The rotary applicator 47 appropriately selects the crimping blade 33 corresponding to the wire diameter.

The slider 35 in FIG. 8 is coupled with a T-shape cam body 59 as shown in FIG. 10. The cam body 59 is coupled with an eccentric shaft 61 of a rotary plate 60 (FIG. 8). The rotary plate 60 is coupled with a rotary shaft 63 of a decelerator 62 of the servo motor 34. The eccentric shaft 61 is slidably, in a horizontal direction, engaged with a horizontal groove 64 of the cam body 59 through the slider 65. While the rotor 64 rotates by the rotation of the servo motor 34, the eccentric shaft 61 moves in the horizontal groove 64 of the cam body 59. Thus, the cam body 59 ascends or descends integrally with the slider 35. The slider 35 moves vertically along a guide 66.

Figures 11A, 11B, 11C:
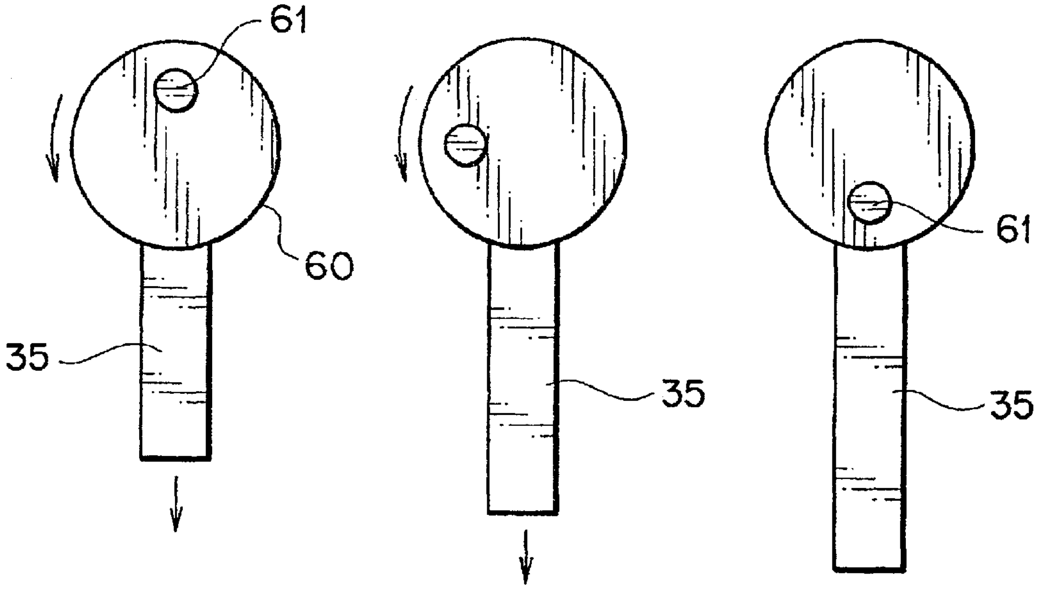
FIGS. 11A to 11C are front views showing the movement of a rotary plate and a slider in the crimper.

The rotary plate 60 is set rotatably unidirectionally over 0–360°. As shown in FIGS. 11A to 11C, when the rotary plate 60 rotates from 0° to 180°, the slider 35 descends to stay at a lower dead point (FIG. 11C). When the rotary plate 60 rotates from 180° to 360°, the slider 35 ascends to stay at an upper dead point (FIG. 11A). As described above, the slider 35 and crimping blade 35 ascend or descend integrally. A next stroke of the slider 35 can be obtained by inverting the rotary plate 35 by the servo motor 34 (FIG. 3). Such an ascent/descent system has been already proposed.

The crimping device 1 according to the present invention, to which the above ascent/descent system is applied, can deal with several kinds of connectors having different wire crimping strokes (crimping heights). Specifically, by appropriately setting the rotary angle of the servo motor 34, i.e. that of the rotary plate 60, the ascent/descent stroke of the crimping blade 33 can be changed freely. For example, if the rotary plate 60 is inverted when it rotates 90° as shown in FIG. 2, the stroke of the slider 35, i.e. crimping blade 33 is half as large as that when it rotates 180° (FIG. 11C). In this way, since the crimping height can be managed by the servo motor 34, the tooling change is not required, thus dealing with many kinds of connectors 20 quickly. Such a configuration is also useful as a technique of adjusting the crimping height.

On the other hand, in FIG. 3, the lugs 69 of the sliders 35 in the crimpers 3 and 3', engaged with the grooves of the wire holders 70, respectively are oppositely arranged ahead of the crimping blades 33. The wire holder 70 is supported vertically slidably in the holder 72. The tip 70*a* of the wire holder 70, as shown in FIG. 12, is located in proximity above the wire 21.

On the other hand, a wire receiver 73 is arranged oppositely on the lower side of the wire holder 70 and immediately beneath or in proximity to the wire 21. The wire receiver 73 is secured to the tip of a rod 75 of a vertical air cylinder 74 serving as an actuator and can ascend/descend freely by expansion/contraction of the rod 75. The air cylinder 74 is secured to the frame 2, and the wire receiver 73 is located immediately beneath the wire 21 in a state where the rod 75 has been extended to the greatest degree. The wire holder 70 and the wire receiver 73 are formed in a bar, blade or block shape.

Figure 12:
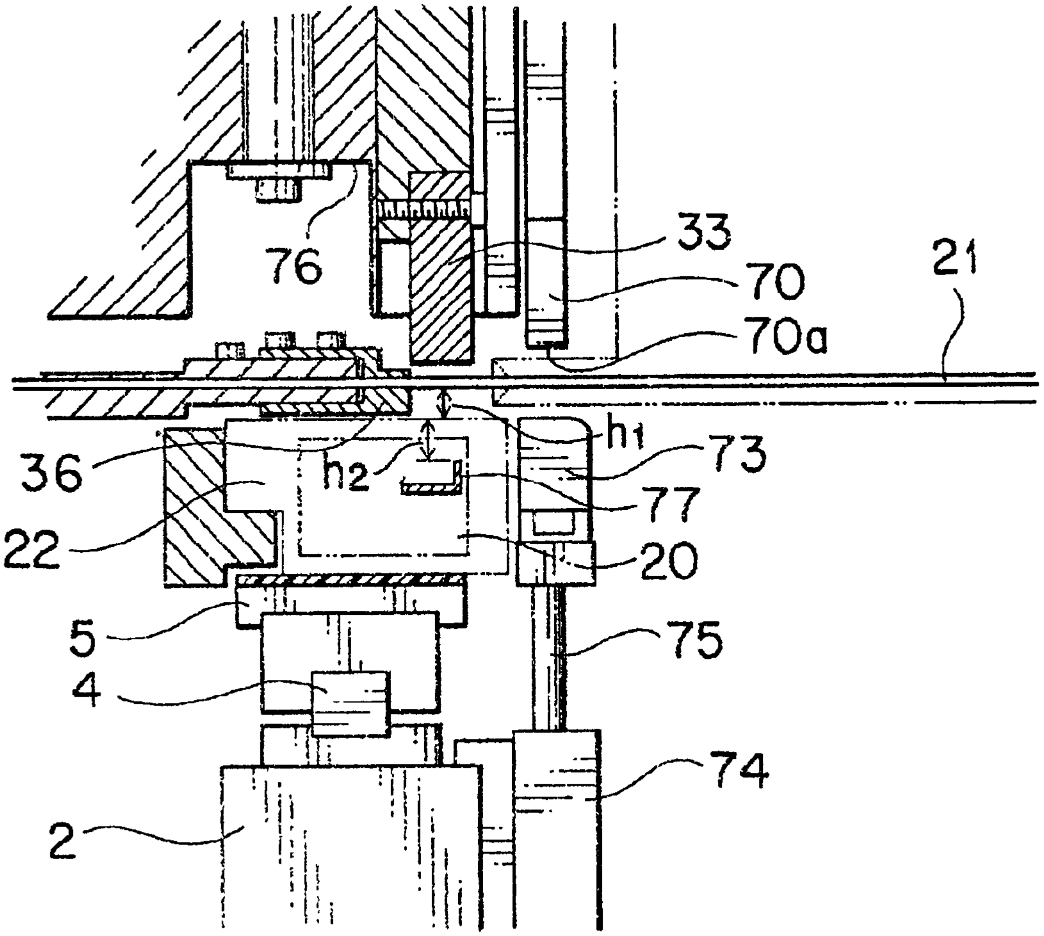
FIG. 12 is a side view showing the main part of a crimper inclusive of a wire holder and a wire receiver.
Figure 13:
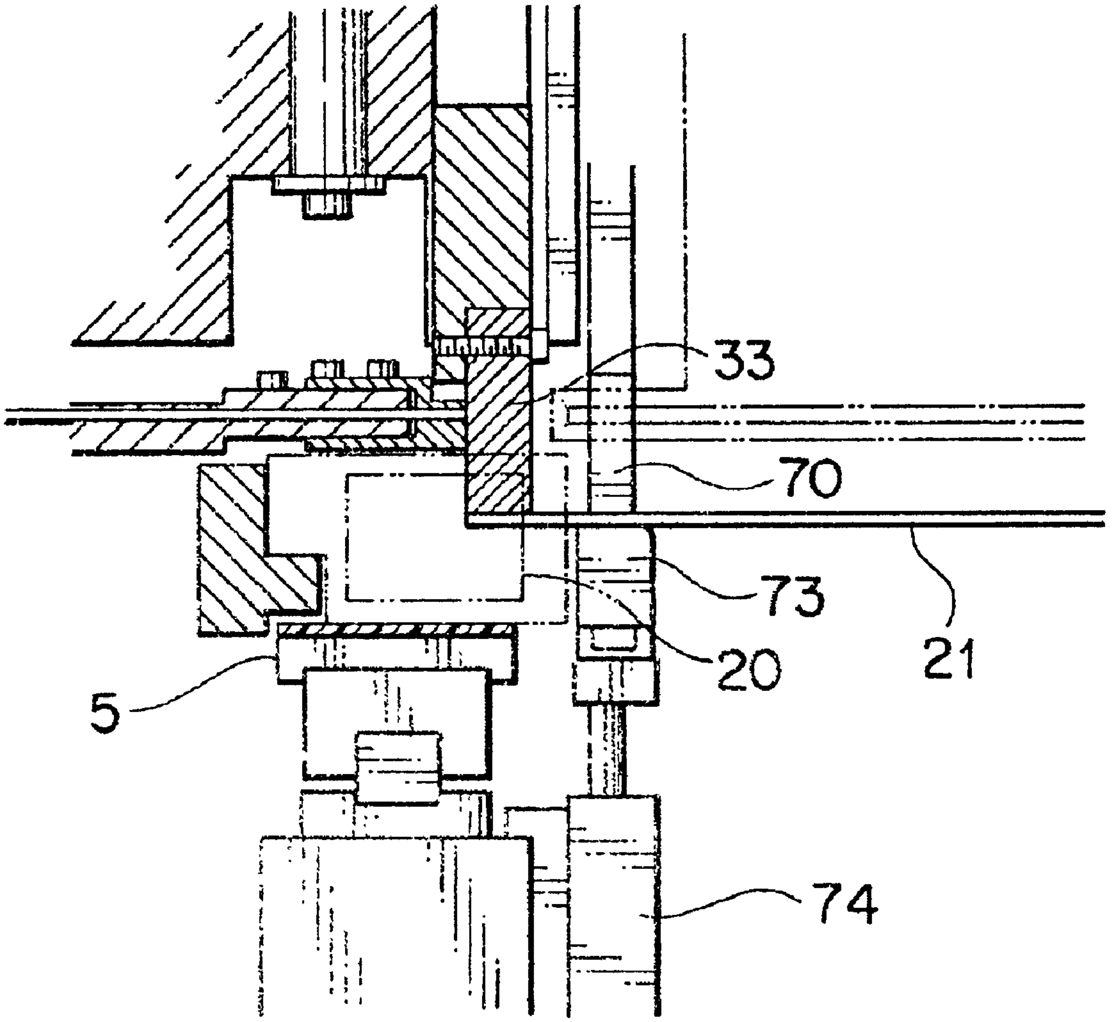
FIG. 13 is a side view showing the state where a wire has been crimped on a connector.
Figure 14:
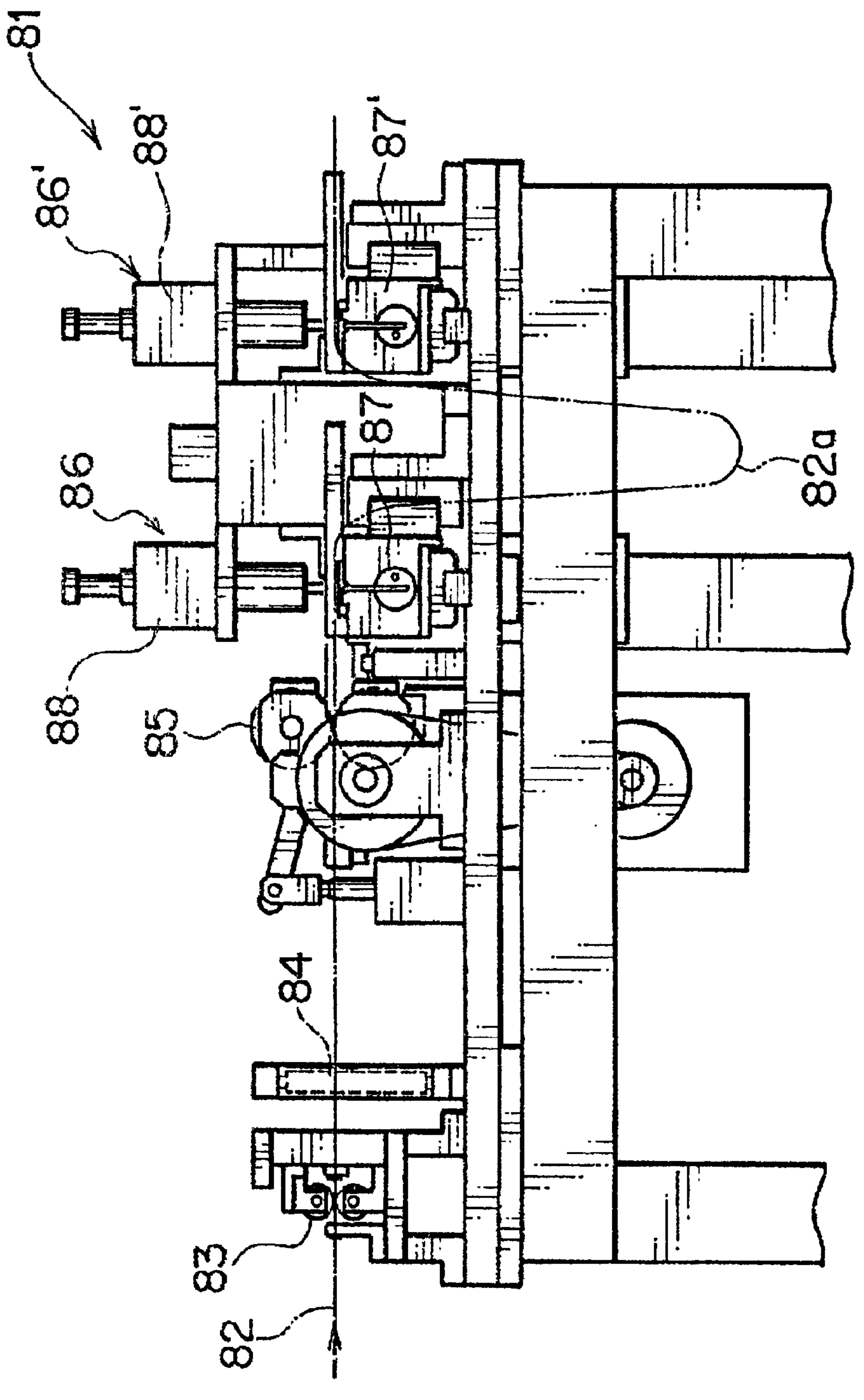
FIG. 14 PRIOR ART
FIG. 14 is a side view of a conventional crimping apparatus.
Figure 15:
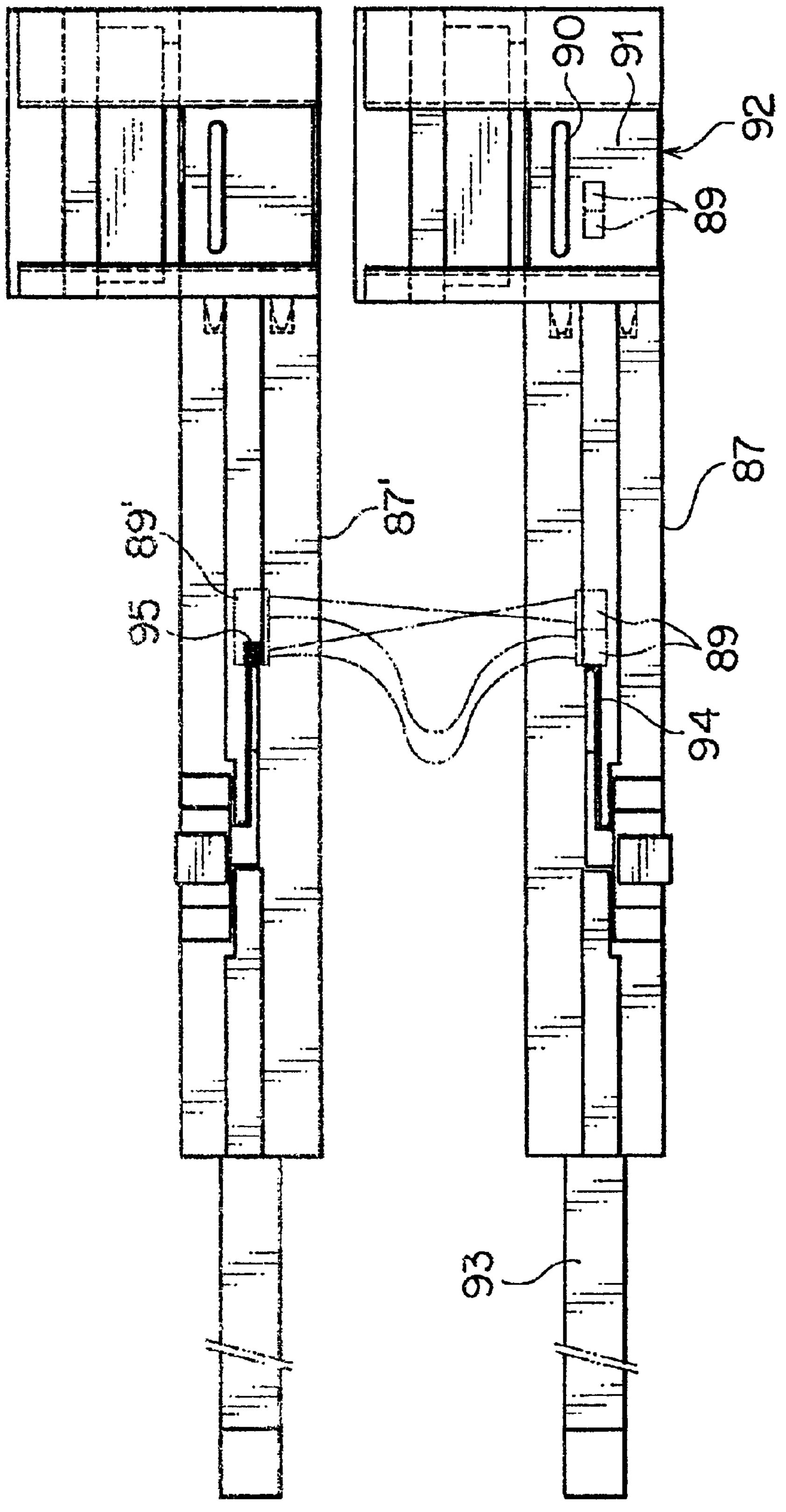
FIG. 15 PRIOR ART
FIG. 15 is a plan view of the main part of the conventional apparatus inclusive of a connector supply section.
Figure 16A:
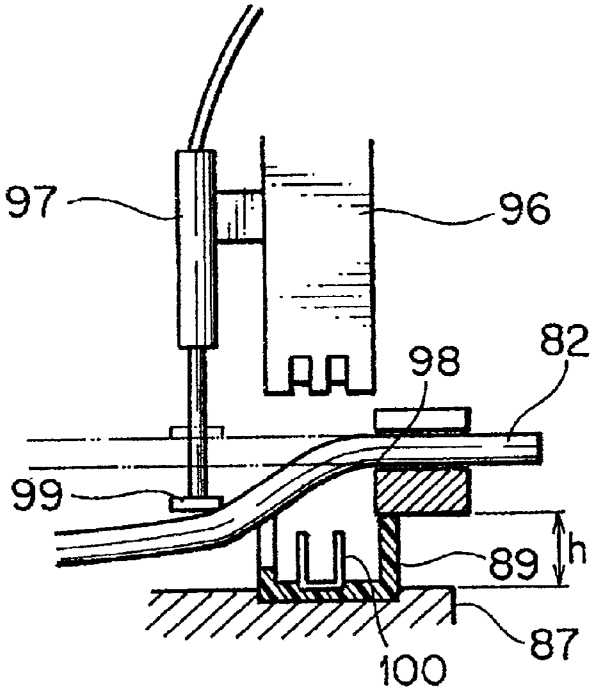
F I G. 16A PRIOR ART
FIGS. 16A and 16B are side views of the state where a wire is crimped on the connector using a wire holder.
Figure 16B:
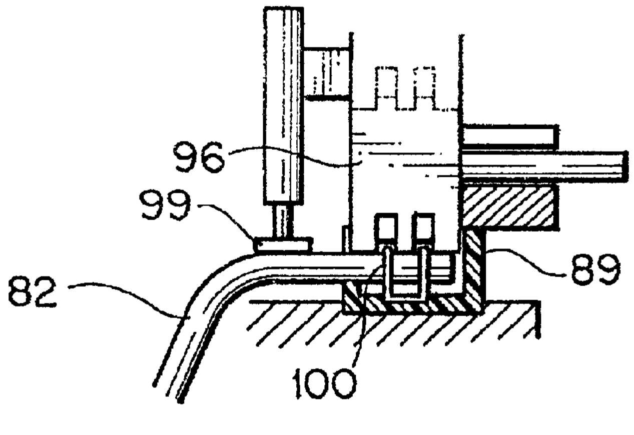
F I G. 16B PRIOR ART

In FIG. 12, as the crimping blade 33 descends, the wire holder 70 also descends in interlock therewith. Then, the wire 21 is cut by the blade of the crimping blade 33 (upper blade) and a cutter (lower blade) 36, and as shown in FIG. 13, it is sandwiched between the wire holder 70 and the wire receiver 73 immediately beneath the wire 21. At the same time, the air cylinder 74 is pressure-reduced so that it supports the wire 21 as a weak spring. Otherwise, using the air cylinder 74 which has lower load than the push-down force of the wire holder 70 and is not pressure-reduced, the wire holder 70 may push down the wire receiver 73 through the wire 21.

The wire receiver 73 can further ascend from the state of FIG. 12 to immediately beneath the wire 21 by extension of the cylinder 74. The wire is fixed, in its shifting direction, relative to the crimping blade 33 by the cutter (portion of the wire guide 26), wire holder 70 and wire receiver 73, and is supported with no warp.

While the wire 21 stably held between the wire holder 70 and the wire receiver 73 descends together with crimping blade 33, it is surely crimped onto the connector 20 by the crimping blade 33. After wire-crimping, only the crimping blade 33 and wire holder 70 ascend and the air cylinder 74 is completely pressure-reduced to hold the wire receiver 73 in a descended state so that the wire 21 is not pushed up by the wire receiver 73. After the wire 21 is removed from the wire receiver 73 by horizontal movement of the connector table 5, the wire receiver 73 ascends as shown in FIG. 12.

The above configuration is also efficient as a technique of supporting the wire. In accordance with the wire supporting structure and method described above, even when the height $h_1$ from the wire 21 to the upper surface of the connector or the height $h_2$ from the connector upper face to crimping terminal 77 is large, the wire 21 can be surely positioned and crimped on the crimping terminal 77, thereby assuring the crimping quality.

What is claimed is:

1. A crimping apparatus comprising:

a pair of frames arranged orthogonally to a wire shifting direction;

a pair of crimpers each provided centrally in each frame;

a pair of connector tables each provided movably in the longitudinal direction of the frame;

locking means for securing the connector tables on both ends of each frame;

moving means for moving each said connector table along the frame; and a pair of connector holding poles in each of which a plurality of connectors are arranged to be settable on each said connector table.

2. A crimping apparatus according to claim 1, wherein said moving means comprises a driving means driven by a servo motor, a cylinder secured to the driving means and an engagement hole formed in said connector holding pole in which a rod of the cylinder is engaged.

3. A crimping apparatus according to claim 1, wherein said crimper comprises a plurality of applicators having different crimping blades, a rotor with said plurality of applicators arranged circumferentially and means of rotating said rotor.

4. A crimping apparatus according to claim 3, wherein said crimper comprises a slider for moving up and down said crimping blade, a cam body secured to the slider and having a horizontal groove, a rotating plate having an eccentric shaft to be engaged with said horizontal groove and a servo motor for driving said rotating plate.

* * * * *